(12) United States Patent
Takata et al.

(10) Patent No.: US 12,438,614 B2
(45) Date of Patent: Oct. 7, 2025

(54) FREE SPACE OPTICAL COMMUNICATION APPARATUS, FREE SPACE OPTICAL COMMUNICATION SYSTEM, AND FREE SPACE OPTICAL COMMUNICATION METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 18/230,460

(22) Filed: Aug. 4, 2023

(65) Prior Publication Data
US 2024/0063904 A1     Feb. 22, 2024

(30) Foreign Application Priority Data
Aug. 16, 2022    (JP) ................. 2022-129457

(51) Int. Cl.
*H04B 10/00* (2013.01)
*H04B 10/112* (2013.01)

(52) U.S. Cl.
CPC ................. *H04B 10/1121* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1143; H04B 10/1149; H04B 10/118; H04B 10/116; H04B 10/40
USPC ....... 398/118, 119, 120, 121, 122, 123, 124, 398/125, 126, 127, 128, 129, 130, 131, 398/135, 136, 158, 159, 33, 38, 172
See application file for complete search history.

(56) References Cited

U.S. PATENT DOCUMENTS

| | | | |
|---|---|---|---|
| 2004/0165892 A1* | 8/2004 | Mendenhall ............ | G01S 3/789 398/118 |
| 2015/0215040 A1* | 7/2015 | Dickson ............. | H04B 10/1125 398/131 |
| 2016/0087722 A1* | 3/2016 | Wabnig ............. | H04B 10/1143 398/131 |

FOREIGN PATENT DOCUMENTS

| | | |
|---|---|---|
| JP | H02-237329 A | 9/1990 |
| JP | H09-107330 A | 4/1997 |
| JP | 2006-333070 A | 12/2006 |
| JP | 2015-065492 A | 4/2015 |

* cited by examiner

*Primary Examiner* — Hanh Phan

(57) ABSTRACT

To provide a free space optical communication apparatus with an increased efficiency of optical axis alignment. A free space optical communication apparatus (1) includes: light transmitting sections (10); and an optical axis alignment section (20) configured to align an optical axis of each of the light transmitting sections (10) with a corresponding one of light receiving sections (130) included in a communication target. The optical axis alignment section (20) causes at least one of the light transmitting sections (10) to emit scan light (3) while varying an emitting direction, and aligns an optical axis of a light transmitting section (10) which is other than the at least one light transmitting section (10), based on an emitting direction of the scan light (3) emitted from the at least one light transmitting section (10) and received by a corresponding one of the light receiving sections (130).

9 Claims, 10 Drawing Sheets

FREE SPACE OPTICAL COMMUNICATION APPARATUS, FREE SPACE OPTICAL COMMUNICATION SYSTEM, AND FREE SPACE OPTICAL COMMUNICATION METHOD

CROSS REFERENCE TO RELATED APPLICATIONS

This Nonprovisional application claims priority under 35 U.S.C. § 119 on Patent Application No. 2022-129457 filed in Japan on Aug. 16, 2022, the entire contents of which are hereby incorporated by reference.

TECHNICAL FIELD

The present invention relates to free space optical communication apparatuses, free space optical communication systems, and free space optical communication methods.

BACKGROUND ART

In a technique for performing optical communication by transmitting and receiving a directional optical communication medium, it is necessary to arrange the light transmitter and the light receiver to face each other so as to match the communication directions (optical axes). To match the optical axes (to align the optical axes), Patent Literature 1, for example, discloses that the direction of a stage on which a light emitting section for communication, a light emitting section for search, and a light receiving section, which are included in a parent device, are secured is adjusted so that the optical axis of the parent device, which serves as the light transmitter, is directed toward the child device, to perform the search.

Similarly, in a communication apparatus that realizes spatial multiplex transmission through simultaneous connection of a plurality of beams, it is also necessary to align the optical axes. For example, Patent Literature 2 discloses a free space optical communication apparatus including a mount that has a mechanism for vertically and horizontally adjusting the angle of a unit constituted by a plurality of modules of the light transmitting system or the light receiving system.

CITATION LIST

Patent Literature

[Patent Literature 1]
Japanese Patent Application Publication Tokukaihei No. 09-107330
[Patent Literature 2]
Japanese Patent Application Publication Tokukaihei No. 02-237329

SUMMARY OF INVENTION

Technical Problem

In a free space optical communication apparatus that carries out spatial multiplex transmission, it takes a longer time to perform optical axis alignment individually on multiple light transmitting systems. Therefore, there is a need to develop a technique for efficiently performing the optical axis alignment of a plurality of light transmitting systems.

An example aspect of the present invention was made in view of this problem, and an example object thereof is to provide a technique for efficiently performing optical axis alignment of a plurality of light transmitting systems in a free space optical communication apparatus that carries out spatial multiplex transmission.

Solution to Problem

A free space optical communication apparatus in accordance with an example aspect of the present invention includes a plurality of light transmitting sections and at least one processor, the at least one processor carrying out an optical axis alignment process of aligning an optical axis of each of the plurality of light transmitting sections with a corresponding one of a plurality of light receiving sections included in a communication target of the free space optical communication apparatus, in the optical axis alignment process, the at least one processor causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

A free space optical communication system in accordance with an example aspect of the present invention includes a plurality of free space optical communication apparatuses, at least two of the plurality of free space optical communication apparatuses each including a plurality of light transmitting sections and at least one processor, the at least one processor carrying out an optical axis alignment process of aligning an optical axis of each of the plurality of light transmitting sections with a corresponding one of a plurality of light receiving sections included in a free space optical communication apparatus that is a communication target, in the optical axis alignment process, the at least one processor causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

A free space optical communication method in accordance with an example aspect of the present invention is a free space optical communication method for a first free space optical communication apparatus including a plurality of light transmitting sections, and a second free space optical communication apparatus including a plurality of light receiving sections and serving as a communication target of the first free space optical communication apparatus, the method including: aligning an optical axis of each of the plurality of light transmitting sections with a corresponding one of the plurality of light receiving sections, aligning the optical axis including: causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

An example aspect of the present invention includes a computer-readable non-transitory storage medium storing a program for causing a computer to carry out the abovementioned process.

Advantageous Effects of Invention

According to an example aspect of the present invention, it is possible to provide a free space optical communication apparatus, a free space optical communication system, and a free space optical communication method each of which has increased efficiency of optical axis alignment.

EXAMPLE EMBODIMENTS

First Example Embodiment

The following description will discuss a first example embodiment of the present invention in detail with reference to the drawings. The present example embodiment is a basic form of example embodiments described later.

(Configuration of Free Space Optical Communication System)

Figure 1:
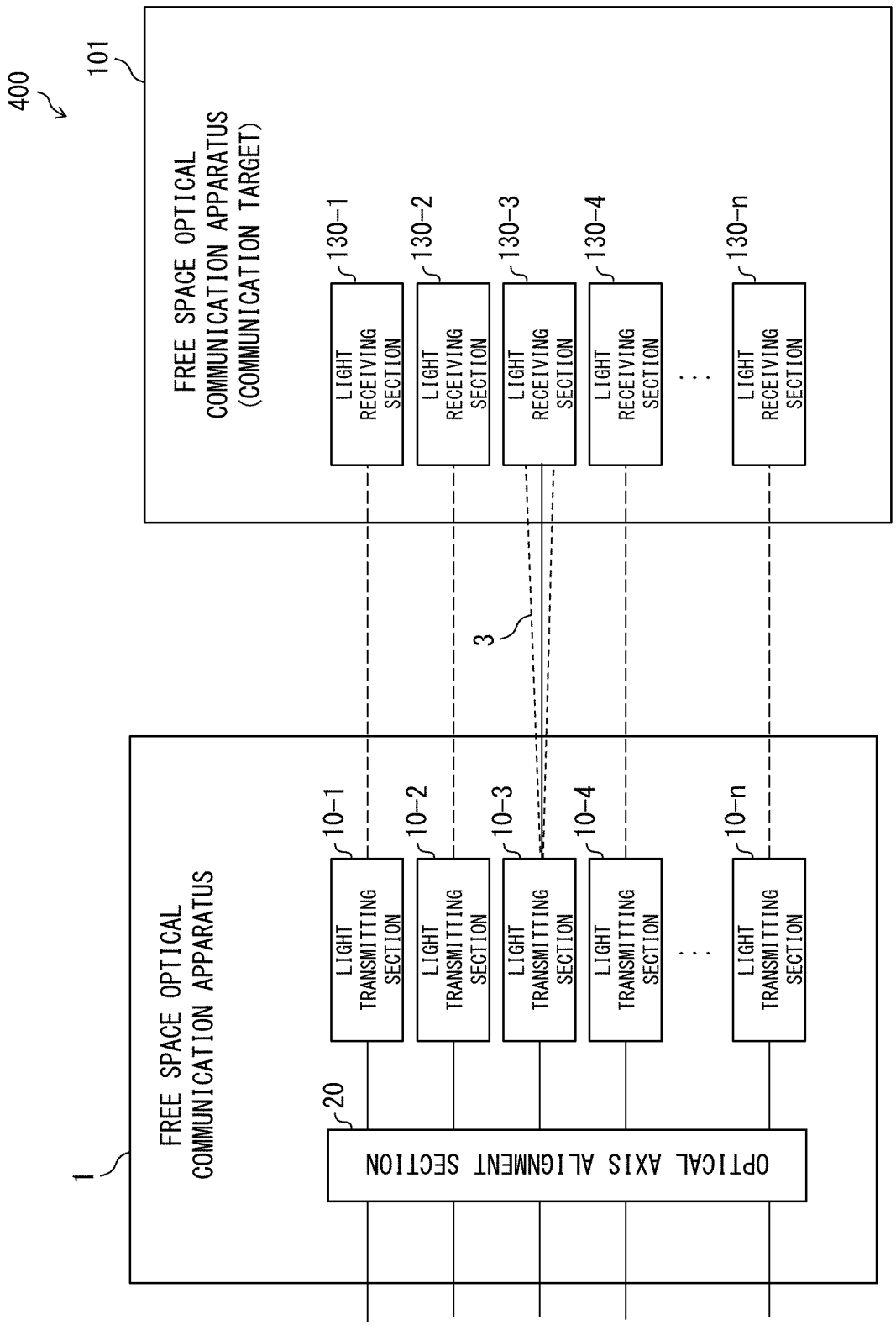
FIG. 1 is a block diagram illustrating a configuration of a free space optical communication system including a free space optical communication apparatus in accordance with a first example embodiment of the present invention.

The following description will discuss a configuration of a free space optical communication system including a free space optical communication apparatus in accordance with the present example embodiment with reference to FIG. 1. FIG. 1 is a block diagram illustrating the configuration of a free space optical communication system 400. The free space optical communication system 400 includes free space optical communication apparatuses 1 and 101, and realizes spatial multiplex transmission through simultaneous connection of a plurality of beams. FIG. 1 illustrates an example including two free space optical communication apparatuses 1 and 101; however, the number of the free space optical communication apparatuses is not limited to this. Hereunder, the one free space optical communication apparatus 1 will be mainly discussed, and the other free space optical communication apparatus 101 will be discussed as a communication target of the free space optical communication apparatus 1; however, the free space optical communication apparatuses 1 and 101 can be configured identically.

(Configuration of Free Space Optical Communication Apparatus)

As illustrated in FIG. 1, the free space optical communication apparatus 1 in accordance with the present example embodiment includes a plurality of light transmitting sections 10-1 to 10-$n$ and an optical axis alignment section 20. Each of the plurality of light transmitting sections 10-1 to 10-$n$ is one implementation example of a light transmitting section recited in the claims. The optical axis alignment section 20 is one implementation example of at least one processor recited in the claims that carries out an optical axis alignment process.

(Light Transmitting Sections 10-1 to 10-$n$)

An optical communication medium transmitted from each of the plurality of light transmitting sections 10-1 to 10-$n$ is received by a corresponding one of a plurality of light receiving sections 130-1 to 130-$n$ in the free space optical communication apparatus 101, which is a communication target. The optical communication medium is a directional optical communication medium. A specific example of the optical communication medium may be electromagnetic wave of a high frequency region including a frequency of not less than approximately 10 GHz; however, the present example embodiment is not limited to this. Examples of the electromagnetic wave of this frequency region may encompass millimeter wave, submillimeter wave, infrared light, visible light, and ultraviolet light.

For example, each of the light transmitting sections 10-1 to 10-$n$ emits electromagnetic wave of the frequency region in such a manner that the electromagnetic wave is directed at an angle within a given angle range, to use the electromagnetic wave as the abovementioned directional optical communication medium in communication. Here, although the present example embodiment is not limited to a specific configuration for directing the electromagnetic wave of the above frequency region in each of the light transmitting sections 10-1 to 10-$n$, each of the light transmitting sections 10-1 to 10-$n$ may be configured to include, for example, the followings:

A beam forming antenna that emits millimeter wave or submillimeter wave in such a manner that the millimeter wave or the submillimeter wave is directed at an angle within a given angle range;

A collimator that collimates infrared light, visible light, or ultraviolet light;

A laser oscillator that generates a laser beam of infrared light, visible light, or ultraviolet light; and/or A modulator that modulates a laser beam by changing the phase of liquid crystal.

Emitting the electromagnetic wave of the abovementioned frequency region by each of the light transmitting sections 10-1 to 10-$n$, serving as the optical communication medium, in a directing manner, increases an energy density of the optical communication medium. This enables communication with a communication target at a farther location with use of the optical communication medium.

Note that the number of the light transmitting sections included in the free space optical communication apparatus 1 does not limit the present example embodiment. The light transmitting sections 10-1 to 10-$n$ may be configured to be capable of receiving light (receiving an optical communication medium) in addition to transmitting light (transmitting an optical communication medium).

(Optical Axis Alignment Section 20)

The optical axis alignment section 20 aligns the optical axis of each of the plurality of light transmitting sections 10-1 to 10-$n$ with a corresponding one of the plurality of light receiving sections 130-1 to 130-$n$ included in the free space optical communication apparatus 101, serving as the communication target.

To align the optical axes, the optical axis alignment section 20 causes at least one of the plurality of light transmitting sections 10-1 to 10-$n$ to emit scan light 3 while varying the emitting direction. In FIG. 1, a light transmitting section 10-3 is depicted as the at least one light transmitting section. The optical axis alignment section 20 controls the light transmitting section 10-3 to emit the scan light 3 while varying the emitting direction. As the scan light 3, the abovementioned directional optical communication medium is used. When scanning of the scan light 3 is performed, the scan light 3 is received by one or more light receiving sections (light receiving section 130-3, in the example of FIG. 1).

Here, the scanning of the scan light 3 may refer to, for example, a search that is carried out to identify the one or more light receiving sections. It should be noted that the terms "scan" and "scanning" do not specify a specific scan order or the like. The scan light 3 includes information on the light transmitting section from which the scan light 3 is emitted and information on which emitting direction the scan light 3 is emitted in.

Based on the emitting direction of the scan light 3 emitted from at least one light transmitting section (light transmitting section 10-3 in the example of FIG. 1) and received by a corresponding light receiving section, the optical axis alignment section 20 aligns the optical axis of a light transmitting section (light transmitting sections 10-1, 10-2, 10-4 to 10-$n$ in the example of FIG. 1) which is other than the at least one light transmitting section (light transmitting section 10-3 in the example of FIG. 1).

As discussed above, the scan light 3 includes various kinds of information. Therefore, when the corresponding light receiving section has successfully received the scan light 3, that is, when the optical axis alignment has been successfully performed, this allows the optical axis alignment section 20 to obtain the information included in the scan light 3. For example, when the light receiving section 130-3 of the free space optical communication apparatus 101, serving as the communication target, receives the scan light 3 used in the scanning, the light receiving section 130-3 emits response light that is a response to the scan light 3. The response light is transmitted from the free space optical communication apparatus 101, serving as the communication target, to the free space optical communication apparatus 1. The response light may be transmitted by using free space optical communication with use of an optical communication medium, or may be transmitted by radio or the like. To realize the configuration in which the response light uses free space optical communication with use of an optical communication medium, in an example, the plurality of light receiving sections 130-1 to 130-$n$ are configured to be capable of transmitting light (transmitting an optical communication medium) and receiving light (receiving an optical communication medium), similarly to the light transmitting sections 10-1 to 10-$n$. In this example, the light receiving section 130-3 that has received the scan light 3 emits response light. The response light is then received by any of the light transmitting sections 10-1 to 10-$n$ of the free space optical communication apparatus 1.

The optical axis alignment section 20 aligns the optical axes of the light transmitting sections 10-1, 10-2, and 10-4 to 10-$n$, based on the response light received by any of the light transmitting sections 10-1 to 10-$n$. For example, the optical axis alignment section 20 specifies, by using the light transmitting section 10-3 which has completed the optical axis alignment as a starting point, an azimuth angle, an elevation angle, and a depression angle of the light receiving section 130-3 from which the response light has been emitted.

Based on the emitting direction of the scan light emitted from the light transmitting section 10-3, the optical axis alignment section 20 adjusts the emitting direction of another light transmitting section (10-1, 10-2, 10-4, . . . , 10-N). For example, in an example, the optical axis alignment section 20 may adjust the emitting direction of another light transmitting section to be the same as the emitting direction of the scan light emitted from the light transmitting section 10-3.

As in the foregoing, the free space optical communication apparatus 1 in accordance with the present example embodiment and the free space optical communication system 400 including the free space optical communication apparatus 1 employ the configuration of including the optical axis alignment section 20 configured to align the optical axis of each of the plurality of light transmitting sections 10-1 to 10-$n$ with a corresponding one of the plurality of light receiving sections 130-1 to 130-$n$ included in the free space optical communication apparatus 101, which is the communication target of the free space optical communication apparatus 1, in which configuration the optical axis alignment section 20 causes at least one of the plurality of light transmitting sections 10-1 to 10-$n$ (light transmitting section 10-3) to emit scan light while varying the emitting direction, and, based on the emitting direction of the scan light emitted from the light transmitting section 10-3 and received by a corresponding light receiving section (light receiving section 130-3), the optical axis alignment section 20 aligns the optical axis of a light transmitting section (light transmitting sections 10-1, 10-2, 10-4 to 10-$n$) which is other than the at least one light transmitting section (light transmitting section 10-3). Thus, the present example embodiment achieves an example advantage of making it possible to increase the efficiency of the optical axis alignment of the light transmitting sections and the light receiving sections between the free space optical communication apparatuses 1 and 101. Specifically, since, the scan direction of the scan light with which the optical axis alignment has already been completed is used to align the optical axes of the other light transmitting sections, it is possible to shorten the time required to align the optical axes when compared to an example aspect in which a plurality of light transmitting sections are independently subjected to the optical axis alignment.

(Flow of Free Space Optical Communication Method)

Figure 2:
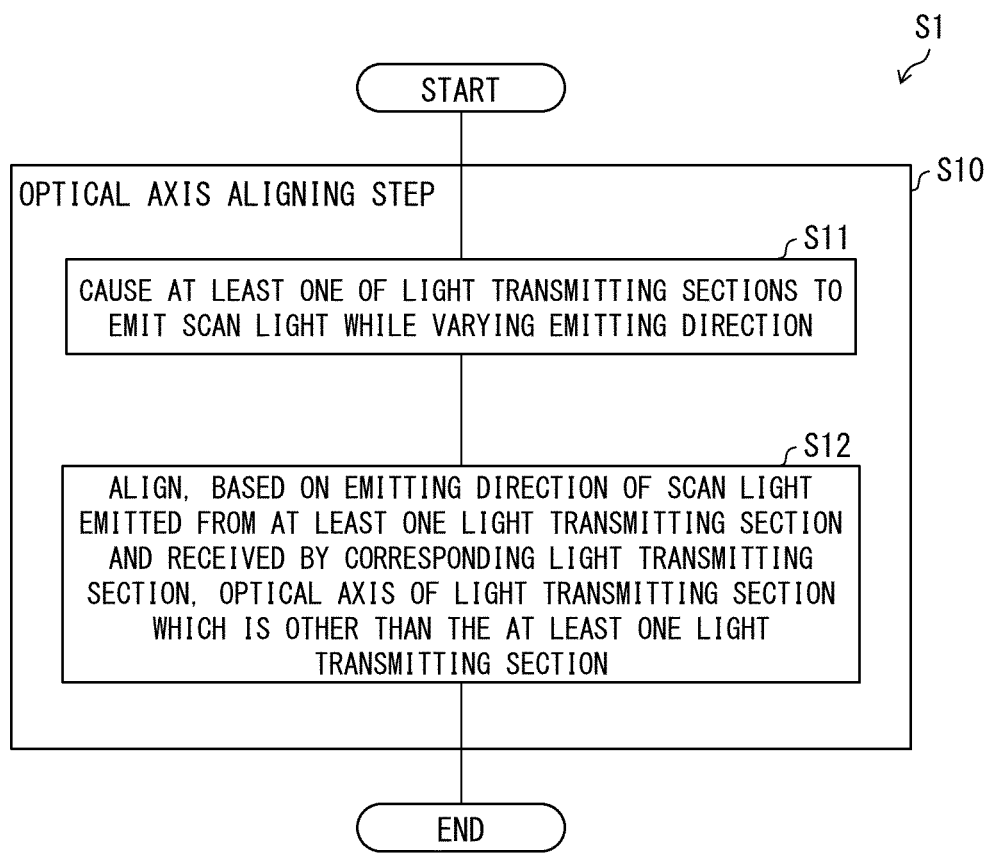
FIG. 2 is a diagram for describing a process flow of a free space optical communication method in accordance with the first example embodiment of the present invention.

The following description will discuss a flow of a free space optical communication method S1 in accordance with the present example embodiment with reference to FIG. 2. FIG. 2 is a flowchart illustrating a flow of the free space optical communication method S1.

As illustrated in FIG. 2, the free space optical communication method S1 includes an optical axis aligning step (S10) of aligning the optical axis of each of the plurality of light transmitting sections with a corresponding one of the plurality of light receiving sections. This optical axis aligning step (S10) includes steps S11 and S12.

(Step S11)

First, in step S11, the optical axis alignment section 20 controls at least one light transmitting section (light transmitting section 10-3), to cause the at least one light transmitting section (light transmitting section 10-3) to emit scan light while varying the emitting direction. This performs the scanning of the scan light, so that one or more light receiving sections included in the free space optical communication apparatus 101, serving as the communication target, are identified. Since the specific process in this step is described above, a description thereof is omitted here.

(Step S12)

In the next step S12, the optical axis of a light transmitting section (light transmitting sections 10-1, 10-2, 10-4 to 10-$n$) which is other than the at least one light transmitting section (light transmitting section 10-3) is aligned based on the emitting direction of the scan light emitted from the at least one light transmitting section (light transmitting section 10-3) and received by the corresponding light receiving section (light receiving section 130-3). Since the specific process in this step is described above, a description thereof is omitted here.

As in the foregoing, the free space optical communication method S1 in accordance with the present example embodiment employs the configuration of including: aligning the optical axis of each of the plurality of light transmitting sections with a corresponding one of the plurality of light receiving sections (S10), aligning the optical axis (S10) including: causing at least one of the plurality of light transmitting sections to emit scan light while varying the emitting direction (S11); and aligning the optical axis of a light transmitting section which is other than the at least one light transmitting section, based on the emitting direction of the scan light emitted from the at least one light transmitting section and received by a corresponding light receiving section (S12). Thus, the free space optical communication method S1 in accordance with the present example embodiment achieves an example advantage of making it possible to increase the efficiency of the optical axis alignment.

Second Example Embodiment

The following description will discuss a second example embodiment of the present invention in detail with reference to the drawings. The same reference numerals are given to constituent elements which have functions identical to those described in the first example embodiment, and descriptions as to such constituent elements are omitted as appropriate.

(Configuration of Free Space Optical Communication System)

Figure 3:
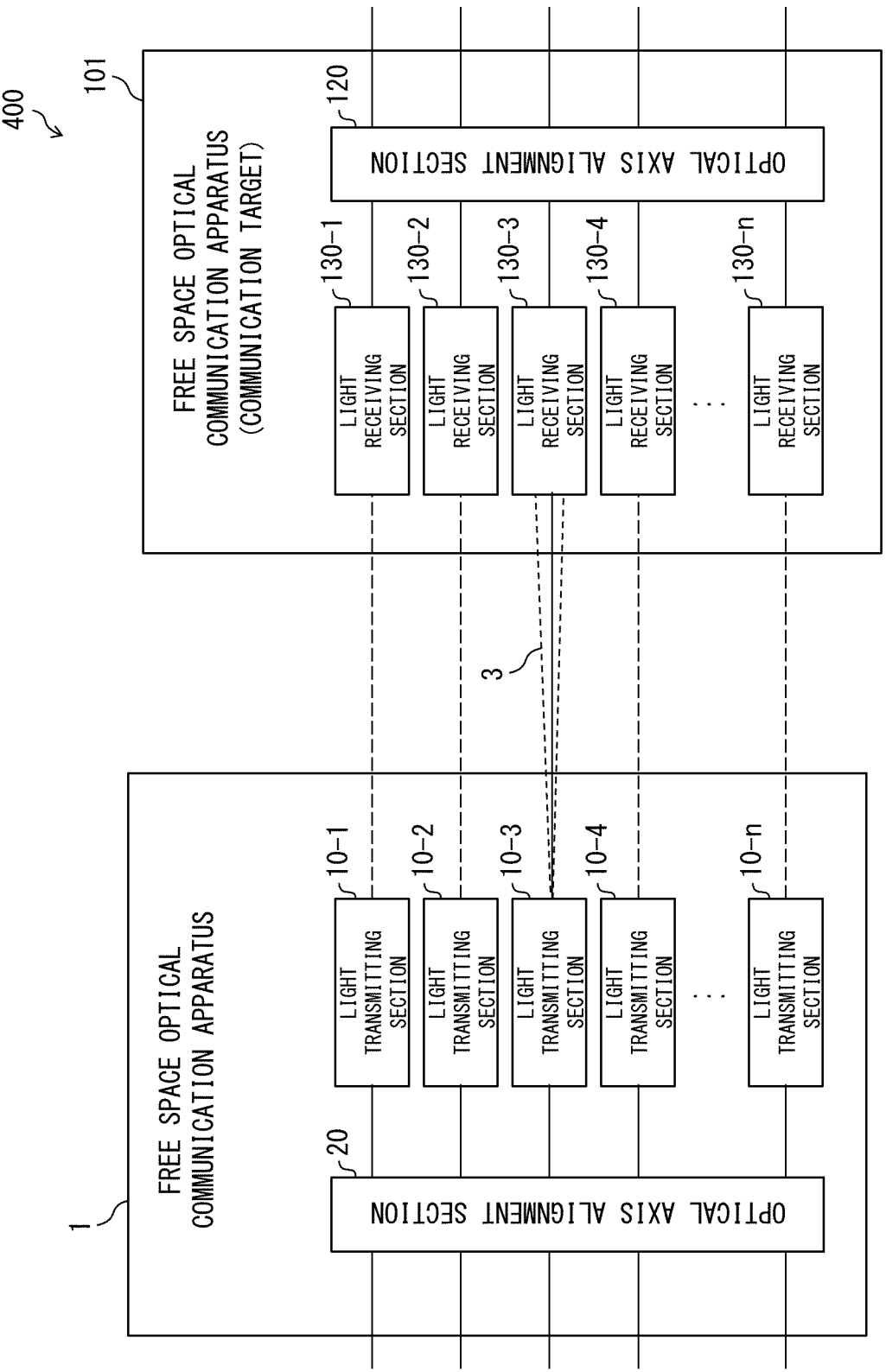
FIG. 3 is a block diagram illustrating a configuration of a free space optical communication system including a free space optical communication apparatus in accordance with a second example embodiment of the present invention.

The following description will discuss a configuration of a free space optical communication system including a free space optical communication apparatus in accordance with the present example embodiment with reference to FIG. 3. FIG. 3 is a block diagram illustrating the configuration of a free space optical communication system 400. The free space optical communication system 400 is a system that realizes spatial multiplex transmission and that includes a first free space optical communication apparatus 1 including a plurality of light transmitting sections 10-1 to 10-$n$, and a second free space optical communication apparatus 101 including a plurality of light receiving sections 130-1 to 130-$n$, which correspond to the plurality of light transmitting sections 10-1 to 10-$n$. FIG. 3 illustrates an example including the first and second free space optical communication apparatuses 1 and 101; however, the number of the free space optical communication apparatuses is not limited to this. Hereunder, the first free space optical communication apparatus 1 will be mainly discussed, and the second free space optical communication apparatus 101 will be discussed as a communication target of the first free space optical communication apparatus 1. Note that the free space optical communication apparatuses 1 and 101 can be configured identically.

(First Free Space Optical Communication Apparatus 1)

As illustrated in FIG. 3, the first free space optical communication apparatus 1 in accordance with the present example embodiment includes the plurality of light transmitting sections 10-1 to 10-$n$ and an optical axis alignment section 20. Each of the plurality of light transmitting sections 10-1 to 10-$n$ is one implementation example of a light transmitting section recited in the claims. The optical axis alignment section 20 is one implementation example of at least one processor recited in the claims that carries out an optical axis alignment process.

(Light Transmitting Sections 10-1 to 10-$n$)

Since an optical communication medium transmitted from each of the plurality of light transmitting sections 10-1 to 10-$n$ is described above, a description thereof is omitted here. The following description will discuss the configuration of each of the light transmitting sections 10-1 to 10-$n$, by using an example illustrated in FIG. 4. In the following description, when a description is common among the light transmitting sections 10-1 to 10-$n$, the description will be made about a light transmitting section 10.

Figure 4:
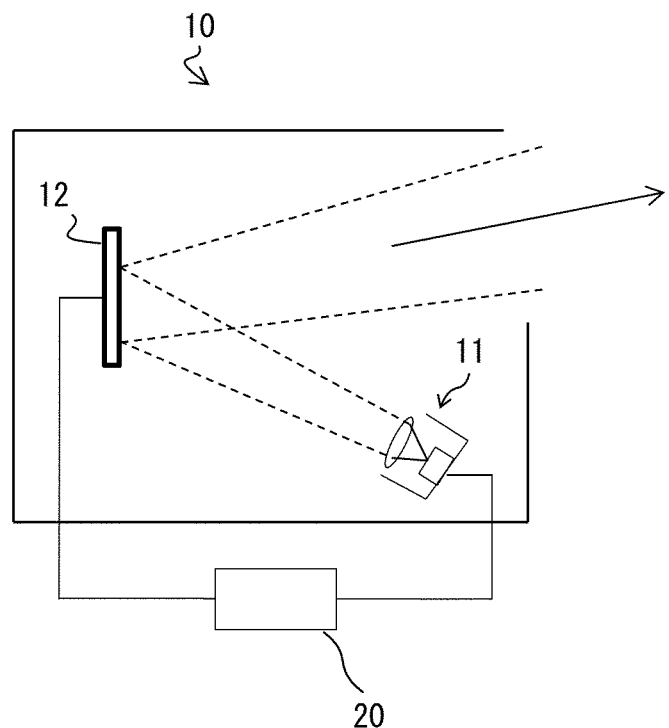
FIG. 4 is a diagram illustrating a configuration of a light transmitting section of the free space optical communication apparatus in accordance with the second example embodiment of the present invention.

FIG. 4 is a configuration example of the light transmitting section 10. The light transmitting section 10 includes a light emitting section 11 and a light modulator 12. The light emitting section 11 and the light modulator 12 are controlled by the optical axis alignment section 20.

The light emitting section 11 includes a known light emitting element and may include, for example, a lens. Light emitted from the light emitting section 11 is incident on the light modulator 12. Turning on of the light emitting section 11 is controlled by the optical axis alignment section 20.

The light modulator 12 allows light of the light emitting section 11 to be incident thereon, and generates an outgoing light satisfying a desired condition. The desired condition may be, for example, a desired wavelength, a desired light intensity, and a desired angle. The light modulator 12 is controlled by the optical axis alignment section 20, to generate light satisfying the desired condition. The outgoing light from the light modulator 12 is directed to a light receiving section 130 of the second free space optical communication apparatus 101.

(Second Free Space Optical Communication Apparatus 101)

The second free space optical communication apparatus 101 includes the plurality of light receiving sections 130-1 to 130-n, which correspond to the plurality of light transmitting sections 10-1 to 10-n of the first free space optical communication apparatus 1. In addition, the second free space optical communication apparatus 101 includes an optical axis alignment section 120.

(Light Receiving Sections 130-1 to 130-n)

Figure 5:
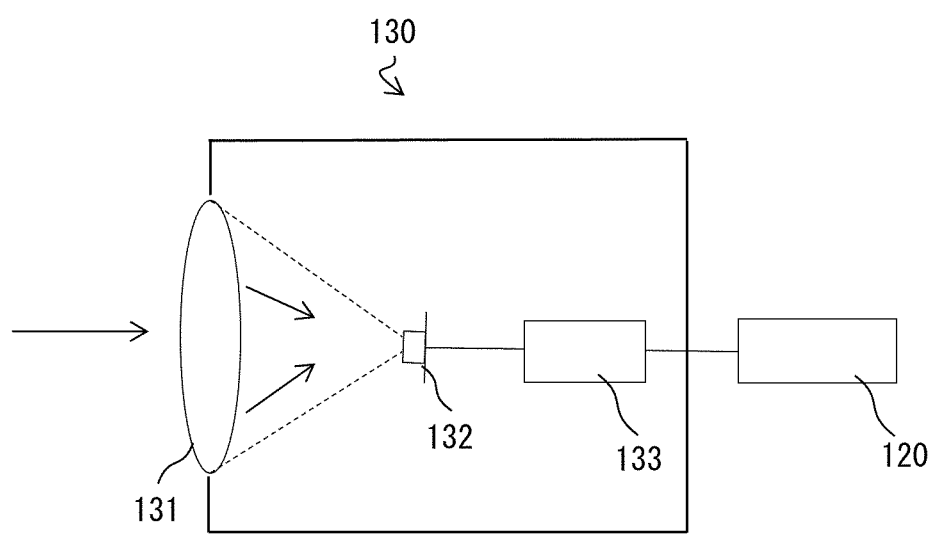
FIG. 5 is a diagram illustrating a configuration of a light receiving section of the free space optical communication apparatus in accordance with the second example embodiment of the present invention.

The following description will discuss the configuration of each of the light receiving sections 130-1 to 130-n of the second free space optical communication apparatus 101, by using an example illustrated in FIG. 5. Each of the plurality of light receiving sections 130-1 to 130-n is one implementation example of a light receiving section recited in the claims. In the following description, when a description is common among the light receiving sections 130-1 to 130-n, the description will be made about a light receiving section 130.

FIG. 5 is a configuration example of the light receiving section 130. The light receiving section 130 includes a condenser lens 131, a light receiving element 132, and a receive circuit 133. An optical communication medium emitted from the light transmitting section 10 of the first free space optical communication apparatus 1 is condensed by the condenser lens 131 and received by the light receiving element 132, and is then subjected to signal processing in the receive circuit 133.

(Optical Axis Alignment Section 120)

The optical axis alignment section 120 is identical in configuration to the optical axis alignment section 20 included in the first free space optical communication apparatus 1. That is, the optical axis alignment section 120 is one implementation example of at least one processor recited in the claims that carries out an optical axis alignment process. The optical axis alignment section 120 controls each component of the light receiving section 130.

(Arrangement of Light Transmitting Sections)

Figure 6:
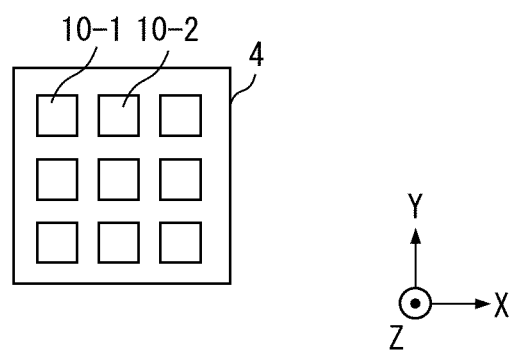
FIG. 6 is a diagram illustrating an arrangement of a plurality of light transmitting sections of the free space optical communication apparatus in accordance with the second example embodiment of the present invention.
Figure 7:
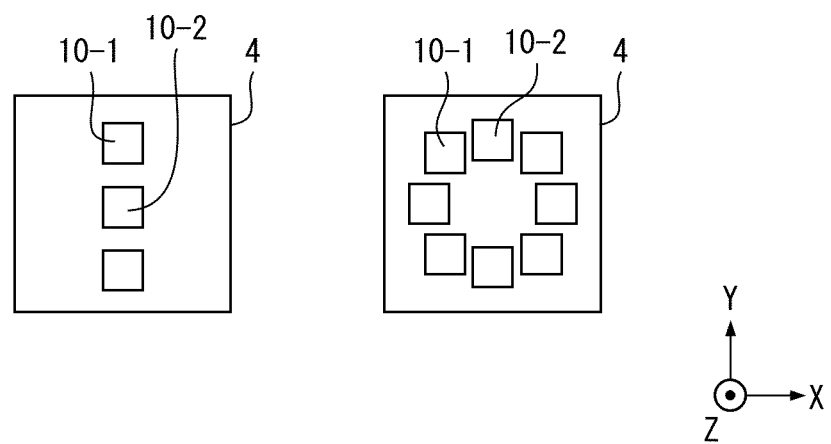
FIG. 7 is a diagram illustrating other examples of the arrangement of the plurality of light transmitting sections of the free space optical communication apparatus in accordance with the second example embodiment of the present invention.

FIG. 6 illustrates an example of what arrangement the plurality of light transmitting sections 10-1 to 10-n may be made in the first free space optical communication apparatus 1. FIG. 6 is a diagram illustrating the plurality of light transmitting sections 10-1 to 10-n when viewed from the respective light emitting sides. The plurality of light transmitting sections 10-1 to 10-n are arranged in a matrix pattern in a plane 4. The arrangement of the light transmitting sections is not limited to that illustrated in FIG. 6, and may be, for example, arrangements as illustrated in FIG. 7. Similarly to FIG. 6, FIG. 7 is a diagram illustrating the plurality of light transmitting sections 10-1 to 10-n when viewed from the respective light emitting sides. As in two examples depicted in FIG. 7, the plurality of light transmitting sections 10-1 to 10-n may be arranged in an array (on the left side of FIG. 7), or alternatively, the plurality of light transmitting sections 10-1 to 10-n may be arranged in a ring shape (on the right side of FIG. 7).

The light receiving sections are disposed at positions so that each light receiving section faces a corresponding one of the light transmitting sections in accordance with the arrangement of the light transmitting sections. Note that the arrangements of the light transmitting sections and the light receiving sections are not limited to those illustrated.

(Optical Axis Alignment Section 20)

Since the optical axis alignment section 20 illustrated in FIG. 3 is described above in the first example embodiment, a description thereof is omitted here.

Figure 8:
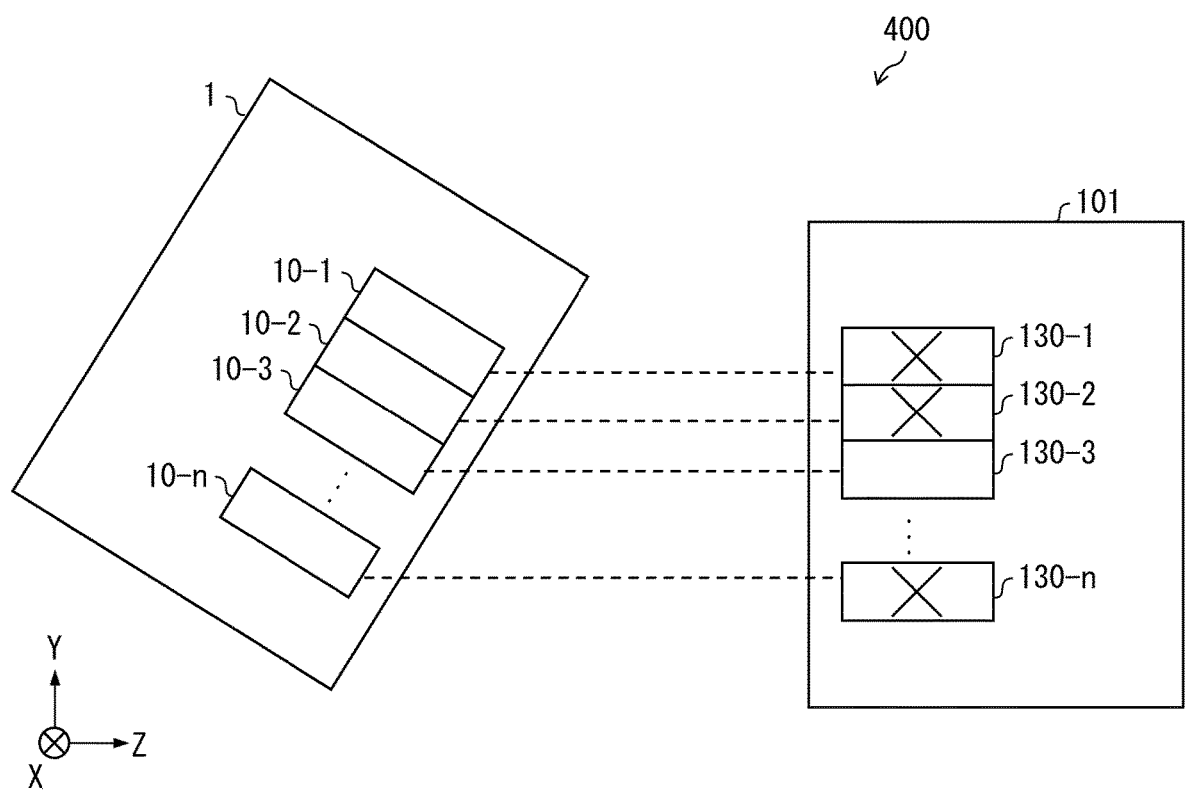
FIG. 8 is a diagram for describing in detail the free space optical communication apparatus in accordance with the second example embodiment of the present invention.

Now referring to FIG. 8, there is schematically illustrated a state in which the light transmitting sections 10-1 to 10-n are inclined in a Z direction for some reason. Here, the Z direction can be defined as a direction of the optical axis. When the light transmitting sections 10-1 to 10-n are inclined in the Z direction, intervals between the light transmitting sections 10-1 to 10-n differs from intervals between the light receiving sections 130-1 to 130-n. In this case, the optical axis alignment section 20 cannot align the optical axis of a light transmitting section which is other than a light transmitting section that has emitted the scan light and has completed the optical axis alignment.

Thus, in the present example embodiment, based on the emitting direction of scan light emitted from each of three or more light transmitting sections and received by a corresponding one of three or more light receiving sections, the optical axis alignment section 20 illustrated in FIG. 3 aligns the optical axis of a light transmitting section which is other than the three or more light transmitting sections. Specifically, the optical axis alignment section 20 causes each of three light transmitting sections 10-1, 10-2, and 10-3 in the arrangement illustrated in FIG. 9, to emit scan light 3, which is described above in the first example embodiment. It is preferable that the three light transmitting sections 10-1, 10-2, and 10-3 in the arrangement illustrated in FIG. 9 be light transmitting sections located at three points where lines connecting two of the light transmitting sections, as indicated by dot-dash lines in FIG. 9, are orthogonal to each other.

Figure 9:
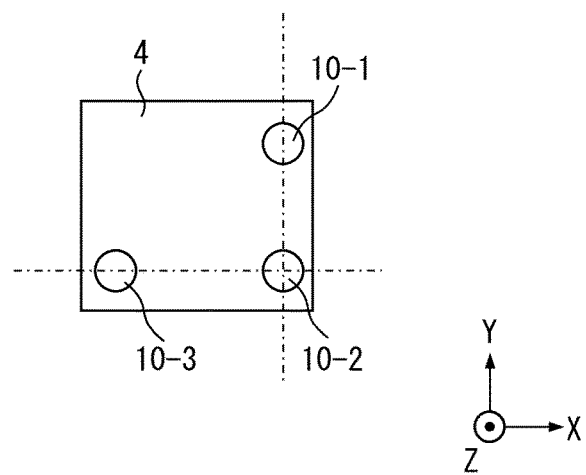
FIG. 9 is a diagram illustrating an arrangement of light transmitting sections each emitting scan light, which are included the plurality of light transmitting sections of the free space optical communication apparatus in accordance with the second example embodiment of the present invention.

In the example aspect illustrated in FIG. 9 in which each of the three light transmitting sections 10-1, 10-2, and 10-3 emits scan light, the optical axis alignment section 20 aligns the optical axes of the other light transmitting sections 10-4 to 10-n, based on the emitting direction of the scan light of each of the three light transmitting sections 10-1, 10-2, and 10-3 (i.e., direction of light received by the corresponding light receiving sections 130-1, 130-2, and 130-3, that is, direction of light with which the optical axis alignment has been completed).

For example, assuming that, using X-Y coordinates in FIG. 9, the position of the light transmitting section 10-2 in the plane 4 is at the origin (0, 0), the position of the light transmitting section 10-1 in the plane 4 is at (0, 1), and the position of the light transmitting section 10-3 in the plane 4 is at (−1, 0), and assuming that the emitting directions of the light transmitting sections 10-1 to 3 are $D_{1\ to\ 3}$, the emitting direction D of a light transmitting section located at (x, y) in the plane 4 may be calculated by the following equation (1):

$$D = -x \times (D_3 - D_2) + y \times (D_1 - D_2) \tag{1}$$

[Variations]

In the foregoing, the results obtained in advance by using the three light transmitting sections are used to align the optical axes of the other light transmitting sections. This makes it possible to align the optical axes of the other light transmitting sections, even when the light transmitting sections are inclined in the Z direction. However, an example aspect of the present invention is not limited to the example aspect in which three light transmitting sections are used. Each of the first free space optical communication apparatus 1 and the second free space optical communication apparatus 101 may sense an inclination in the Z direction by using a sensing device such as a magnetic field sensor.

For example, when a sensing device such as a magnetic field sensor is used to adjust, based on the emitting direction of the scan light emitted from the light transmitting section 10-3, an emitting direction of the other light transmitting sections (10-1, 10-2, 10-4, . . . , 10-N), the optical axis alignment section may operate as follows. First, based on the inclination of the first free space optical communication apparatus 1 in the Z direction and the positional relationship between the light transmitting sections, the optical axis alignment section 20 calculates relative positions of the other light transmitting sections with respect to the light transmitting section 10-3 in three-dimensional space. Next, the optical axis alignment section 20 calculates, based on the emitting direction of the light transmitting section 10-3, a relative position of the light receiving section 130-3 with respect to the light transmitting section 10-3 in three-dimensional space. Next, the optical axis alignment section 20 calculates relative positions of the other light receiving sections (130-1, 130-2, 130-4, . . . , 130-N) with respect to the light transmitting section 10-3 in three-dimensional space based on the relative position of the light receiving section 130-3 with respect to the light transmitting section 10-3 in the three-dimensional space, the positional relationship between the light receiving sections of the second free space optical communication apparatus 101, and an inclination of the second free space optical communication apparatus 101 in the Z direction. Then, the optical axis alignment section 20 may determine emitting directions of the other light transmitting sections based on the relative positions of the other light transmitting sections with respect to the light transmitting section 10-3 in three-dimensional space, and the relative positions of the other light receiving sections with respect to the light transmitting section 10-3 in three-dimensional space.

Example Advantages of Free Space Optical Communication Apparatuses 1 and 101

The free space optical communication apparatuses in accordance with the present example embodiment (first free space optical communication apparatus 1 and second free space optical communication apparatus 101) and the free space optical communication system 400 including these free space optical communication apparatuses employ the configuration of including the optical axis alignment section 20 configured to align the optical axis of each of the plurality of light transmitting sections 10-1 to 10-$n$ with a corresponding one of the plurality of light receiving sections 130-1 to 130-$n$ included in the free space optical communication apparatus 101, which is the communication target of the free space optical communication apparatus 1, in which configuration the optical axis alignment section 20 causes at least one of the plurality of light transmitting sections 10-1 to 10-$n$ (light transmitting section 10-3) to emit scan light while varying the emitting direction, and, based on the emitting direction of the scan light emitted from the light transmitting section 10-3 and received by a corresponding light receiving section (light receiving section 130-3), the optical axis alignment section 20 aligns the optical axis of a light transmitting section (light transmitting sections 10-1, 10-2, 10-4 to 10-$n$) which is other than the at least one light transmitting section (light transmitting section 10-3). Thus, the present example embodiment achieves an example advantage of making it possible to increase the efficiency of the optical axis alignment of the light transmitting sections and the light receiving sections between the free space optical communication apparatuses 1 and 101. Specifically, since, the scan direction of the scan light with which the optical axis alignment has already been completed is used to align the optical axes of the other light transmitting sections, it is possible to shorten the time required to align the optical axes when compared to an example aspect in which a plurality of light transmitting sections are independently subjected to the optical axis alignment.

Further, the free space optical communication apparatuses in accordance with the present example embodiment (first free space optical communication apparatus 1 and second free space optical communication apparatus 101) employ the configuration in which, based on an emitting direction of scan light emitted from each of three or more light transmitting sections and received by a corresponding one of three or more light receiving sections, the optical axis alignment section 20 aligns the optical axis of a light transmitting section which is other than the three or more light transmitting sections. Thus, according to the present example embodiment, even in a case where the plurality of light transmitting sections are inclined in the Z direction, it is possible to align the optical axis of a light transmitting section which is other than the three or more light transmitting sections, based on the emitting direction of each scan light.

Third Example Embodiment

The following description will discuss a third example embodiment of the present invention in detail with reference to the drawings. The same reference numerals are given to constituent elements which have functions identical to those described in the first and second example embodiments, and descriptions as to such constituent elements are not repeated.

(Configuration of Free Space Optical Communication System)

Figure 10:
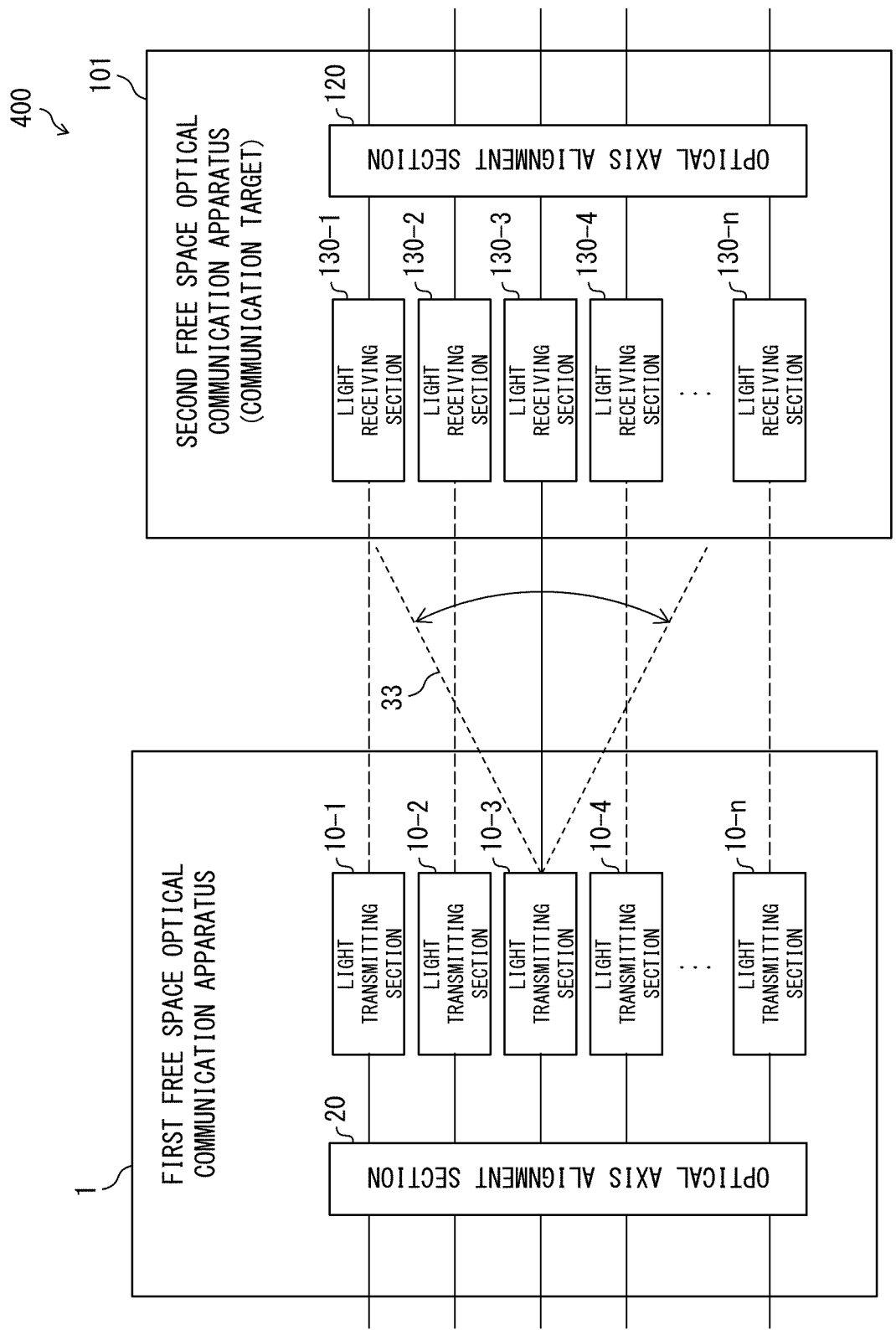
FIG. 10 is a block diagram illustrating a configuration of a free space optical communication system including a free space optical communication apparatus in accordance with a third example embodiment of the present invention.

The following description will discuss a configuration of a free space optical communication system including a free space optical communication apparatus in accordance with the present example embodiment with reference to FIG. 10. FIG. 10 is a block diagram illustrating the configuration of a free space optical communication system 400. The free space optical communication system 400 is identical in basic configuration to the free space optical communication system 400 of the second example embodiment illustrated in FIG. 3. However, the third example embodiment is different from the second example embodiment in that, before the scan light is emitted from the light transmitting section 10-3 under the control of the optical axis alignment section 20, preliminary scan light is emitted from the light transmitting section 10-3 under the control of the optical axis alignment section 20. In short, what is carried out in the control by the optical axis alignment section 20 differs from that in the second example embodiment. The following description will discuss details of the control of the optical axis alignment section 20 of the present example embodiment.

(Optical Axis Alignment Section 20)

The optical axis alignment section 20 causes at least one light transmitting section (light transmitting section 10-3) to emit preliminary scan light 33 that is a bundle of rays, and then, depending on which one of light receiving sections (light receiving section 130-3) the preliminary scan light 33 is received by, the optical axis alignment section 20 controls the emitting direction of scan light made to be emitted by the optical axis alignment section 20 from the at least one light transmitting section (light transmitting section 10-3).

The preliminary scan light 33, which is a bundle of rays, is an optical communication medium made to be emitted by controlling the light transmitting section 10-3. Since the plurality of rays are bundled, a light emitting area is wider than that of the scan light 3 to be subsequently emitted. The preliminary scan light 33 is emitted over a wide area by a modulation function of the light modulator 12 (FIG. 4) of the second example embodiment discussed above. The optical axis alignment section 20 causes the light transmitting section 10-3 to emit the preliminary scan light 33 toward the light receiving sections 130-1 to 130-n.

In the second free space optical communication apparatus 101, to which the preliminary scan light is emitted, at least one of the light receiving sections 130-1 to 130-n (light receiving section 130-3) receives the preliminary scan light. Since the beam diameter of the preliminary scan light 33 is larger than that of the scan light 3 to be subsequently emitted, the preliminary scan light 33 is easily received by a light receiving section, so that it is possible to shorten the scan time by using the preliminary scan light.

The light receiving section that has received the preliminary scan light 33 (light receiving section 130-3 in this example) emits, toward the first free space optical communication apparatus 1, preliminary response light in response to the reception of the light. The preliminary response light is basically identical to the response light described in the first example embodiment. To the preliminary response light, added is information indicating from which light receiving section the response is sent. For example, the information may be position information of a light receiving section that emits the preliminary response light.

In the first free space optical communication apparatus 1 that has received the preliminary response light, the optical axis alignment section 20 controls the emitting direction of scan light made to be emitted from the at least one light transmitting section (light transmitting section 10-3). For example, the optical axis alignment section 20 acquires, from the preliminary response light, the position information of the light receiving section 130-3 that has emitted the preliminary response light, and controls the emitting direction of the scan light with use of this position information.

Example Advantages of Free Space Optical Communication System 400 and First and Second Free Space Optical Communication Apparatuses 1, 101

The free space optical communication apparatuses in accordance with the present example embodiment (first free space optical communication apparatus 1 and second free space optical communication apparatus 101) and the free space optical communication system 400 including these free space optical communication apparatuses employ the configuration of including the optical axis alignment section 20 configured to align the optical axis of each of the plurality of light transmitting sections 10-1 to 10-n with a corresponding one of the plurality of light receiving sections 130-1 to 130-n included in the free space optical communication apparatus 101, which is the communication target of the free space optical communication apparatus 1, in which configuration the optical axis alignment section 20 causes at least one of the plurality of light transmitting sections 10-1 to 10-n (light transmitting section 10-3) to emit scan light while varying the emitting direction, and, based on the emitting direction of the scan light emitted from the light transmitting section 10-3 and received by a corresponding light receiving section (light receiving section 130-3), the optical axis alignment section 20 aligns the optical axis of a light transmitting section (light transmitting sections 10-1, 10-2, 10-4 to 10-n) which is other than the at least one light transmitting section (light transmitting section 10-3). Thus, the present example embodiment achieves an example advantage of making it possible to increase the efficiency of the optical axis alignment of the light transmitting sections and the light receiving sections between the free space optical communication apparatuses 1 and 101. Specifically, since, the scan direction of the scan light with which the optical axis alignment has already been completed is used to align the optical axes of the other light transmitting sections, it is possible to shorten the time required to align the optical axes when compared to an example aspect in which a plurality of light transmitting sections are independently subjected to the optical axis alignment.

Further, the free space optical communication apparatuses in accordance with the present example embodiment (first free space optical communication apparatus 1 and second free space optical communication apparatus 101) employ the configuration in which the optical axis alignment section 20 causes the at least one light transmitting section (light transmitting section 10-3) to emit preliminary scan light 33 that is a bundle of rays, and then, depending on which one of the light receiving sections (light receiving section 130-3) the preliminary scan light 33 is received by, the optical axis alignment section 20 controls the emitting direction of scan light made to be emitted from the at least one light transmitting section (light transmitting section 10-3). Thus, according to the present example embodiment, the preliminary scanning of the preliminary scan light that transmits a bundle of rays over a wide area is performed before the scanning of the scan light. Therefore, the preliminary scanning can roughly estimate the direction of the optical axis, so that it is possible to increase the efficiency of the optical axis alignment.

(Flow of Free Space Optical Communication Method)

Figure 11:
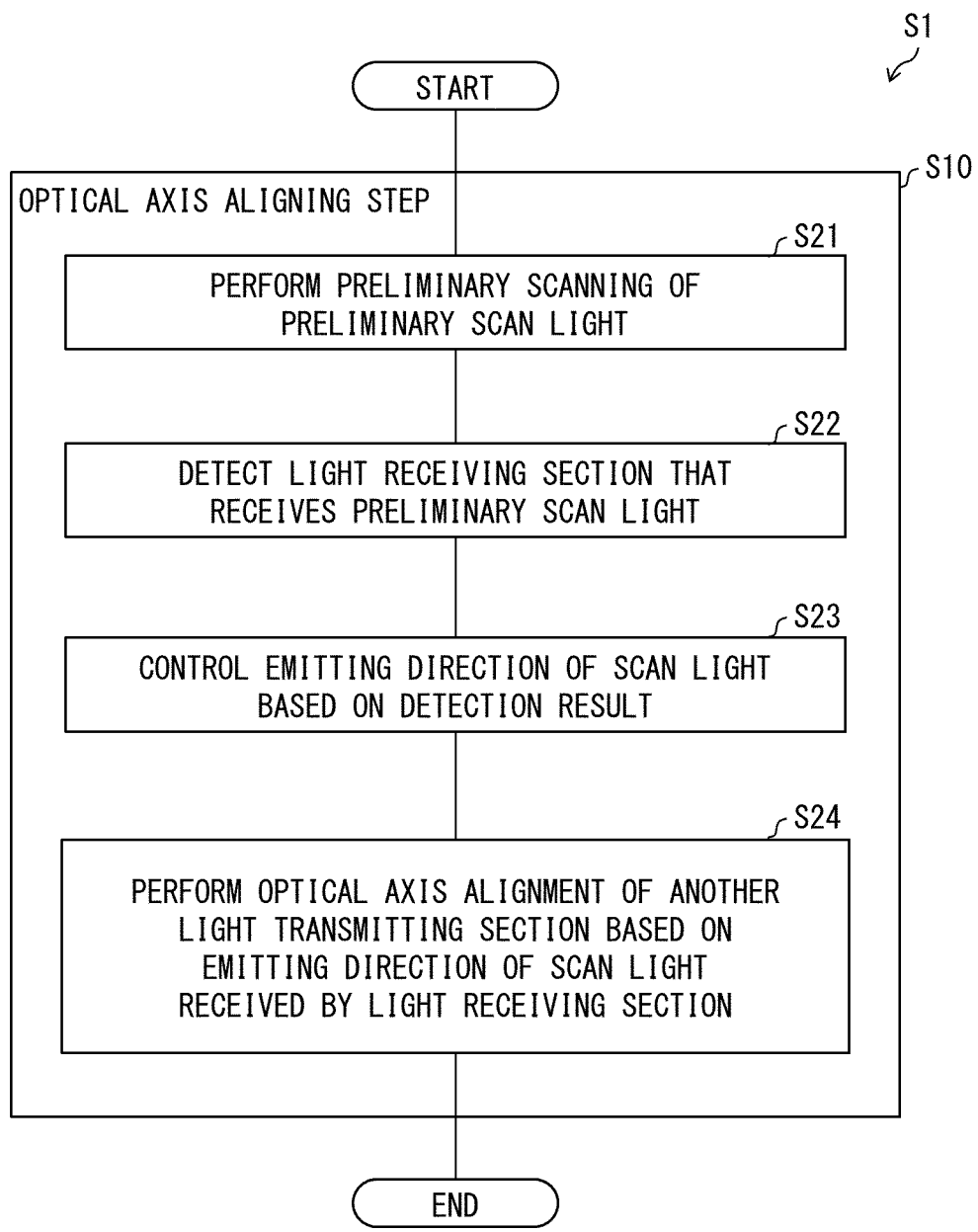
FIG. 11 is a diagram for describing a process flow of a free space optical communication method in accordance with the third example embodiment of the present invention.

The following description will discuss a flow of a free space optical communication method S1 in accordance with the present example embodiment with reference to FIG. 11. FIG. 11 is a flowchart illustrating a flow of the free space optical communication method S1 performed by the free space optical communication system in accordance with the present example embodiment.

As illustrated in FIG. 2, the free space optical communication method S1 includes an optical axis aligning step (S10) of aligning the optical axis of each of the plurality of light transmitting sections with a corresponding one of the plurality of light receiving sections. This optical axis aligning step (S10) includes steps S21, S22, S23, and S24.

(Step S21)

In step S21, the optical axis alignment section 20 controls the light transmitting section 10-3 so that the light transmitting section 10-3 emits the preliminary scan light that is a bundle of rays. Since the preliminary scanning of the preliminary scan light is described above, a detailed description thereof is omitted here.

(Step S22)

In step S22, in response to the emission of the preliminary response light from the light receiving section 130-3 that has received the preliminary scan light emitted in step S21, the optical axis alignment section 20 detects which one of the light receiving sections has received the preliminary scan light.

(Step S23)

In step S23, based on the detection result obtained in step S22, the optical axis alignment section 20 controls the emitting direction of scan light made to be emitted from the light transmitting section 10-3. Since the control of the emitting direction of the scan light is described above, a detailed description thereof is omitted here. The scan light is emitted while varying the emitting direction.

(Step S24)

In step S24, based on the emitting direction of the scan light emitted from the light transmitting section 10-3 and received by the corresponding light receiving section 130-3, the optical axis of a light transmitting section (light transmitting sections 10-1, 10-2, 10-4 to 10-*n*) which is other than the light transmitting section 10-3 is aligned. Since the specific process in this step is described above, a description thereof is omitted here.

As in the foregoing, the free space optical communication method in accordance with the present example embodiment employs the method including: causing at least one light transmitting section (light transmitting section 10-3) to emit preliminary scan light 33 that is a bundle of rays; and controlling, depending on which one of the light receiving sections (light receiving section 130-3) the preliminary scan light 33 is received by, the emitting direction of the scan light made to be emitted from the at least one light transmitting section (light transmitting section 10-3). Thus, it is possible to achieve an example advantage of making it possible to increase the efficiency of the optical axis alignment of the light transmitting sections and the light receiving sections between the free space optical communication apparatuses 1 and 101.

Fourth Example Embodiment

The following description will discuss a fourth example embodiment of the present invention in detail with reference to the drawings. The same reference numerals are given to constituent elements which have functions identical to those described in the first, second, and third example embodiments, and descriptions as to such constituent elements are not repeated.

(Configuration of Free Space Optical Communication System)

Figure 12:
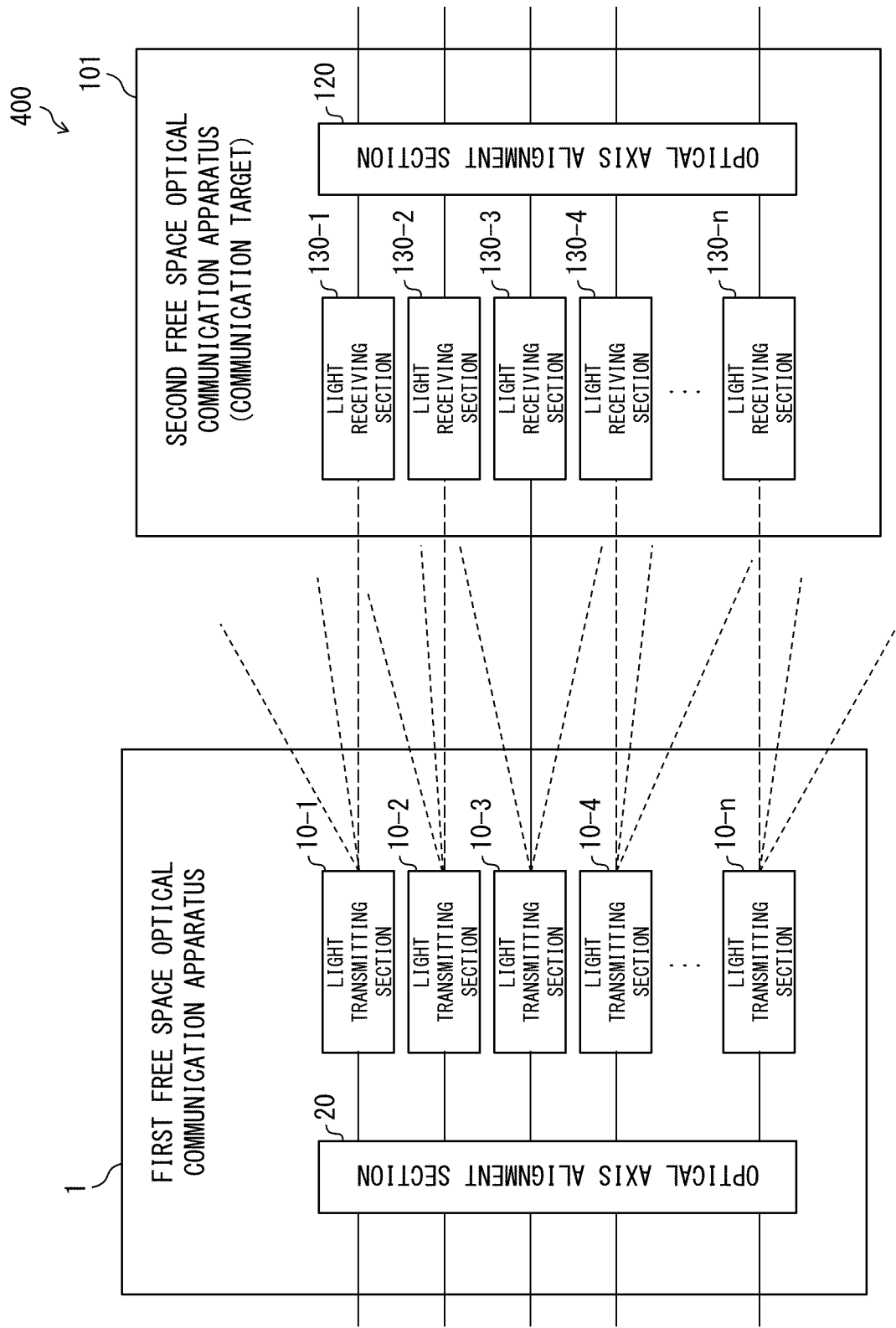
FIG. 12 is a block diagram illustrating a configuration of a free space optical communication system including a free space optical communication apparatus in accordance with a fourth example embodiment of the present invention.

The following description will discuss a configuration of a free space optical communication system including a free space optical communication apparatus in accordance with the present example embodiment with reference to FIG. 12. FIG. 12 is a block diagram illustrating the configuration of a free space optical communication system 400. The free space optical communication system 400 is identical in basic configuration to the free space optical communication system 400 of the abovementioned example embodiment. However, the fourth example embodiment is different from the abovementioned example embodiments in that scan light is emitted from the respective light transmitting sections 10-1 to 10-*n* to respective areas that are different from each other. The following description will discuss details of the control of the optical axis alignment section 20 of the present example embodiment.

(Optical Axis Alignment Section 20)

The optical axis alignment section 20 causes two or more light transmitting sections to emit scan light to respective areas that are different from each other, and aligns, depending on which one of light receiving sections the scan light is received by, the optical axis of a light transmitting section which is other than a light transmitting section that has emitted scan light received. FIG. 12 illustrates a configuration in which scan light is emitted from every light transmitting section 10-1 to 10-*n*, which depicts an example in which the light transmitting sections emit scan light to respective areas that are different from each other.

The scan light emitted from each of the light transmitting sections 10-1 to 10-*n* is configured to be identifiable, so that the light receiving sections 130 can identify which scan light emitted from which light transmitting section has received. The identification may be carried out by the optical axis alignment section 120 of the second free space optical communication apparatus 101, which is the communication target, or may be carried out by the optical axis alignment section 20.

In the second free space optical communication apparatus 101, at least one of the light receiving sections 130-1 to 130-*n* (light receiving section 130-3) receives the scan light. Based on the received scan light, it is determined which light transmitting section (light transmitting section 10-3 in FIG. 12) has the optical axis aligned with that of the at least one light receiving section (light receiving section 130-3). Similarly to the abovementioned example embodiments, the optical axis alignment section 20 aligns the optical axis of another light transmitting section (light transmitting sections 10-1, 10-2, and 10-4 to 10-*n*) with use of the light transmitting direction of the light transmitting section that has the optical axis aligned.

Example Advantages of Free Space Optical Communication System 400 and First and Second Free Space Optical Communication Apparatuses 1, 101

The free space optical communication apparatuses in accordance with the present example embodiment (first free space optical communication apparatus 1 and second free space optical communication apparatus 101) and the free space optical communication system 400 including these free space optical communication apparatuses employ the configuration of including the optical axis alignment section 20 configured to align the optical axis of each of the plurality of light transmitting sections 10-1 to 10-*n* with a corresponding one of the plurality of light receiving sections 130-1 to 130-*n* included in the free space optical communication apparatus 101, which is the communication target of the free space optical communication apparatus 1, in which configuration the optical axis alignment section 20 causes at least one of the plurality of light transmitting sections 10-1 to 10-*n* (light transmitting section 10-3) to emit scan light while varying the emitting direction, and, based on the emitting direction of the scan light emitted from the light transmitting section 10-3 and received by a corresponding light receiving section (light receiving section 130-3), the optical axis alignment section 20 aligns the optical axis of a light transmitting section (light transmitting sections 10-1, 10-2, 10-4 to 10-*n*) which is other than the at least one light transmitting section (light transmitting section 10-3). Thus, the present example embodiment achieves an example advantage of making it possible to increase the efficiency of the optical axis alignment of the light transmitting sections and the light receiving sections between the free space optical communication apparatuses 1 and 101. Specifically, since, the scan direction of the scan light with which the optical axis alignment has already been completed is used to align the optical axes of the other light transmitting sections, it is possible to shorten the time required to align the optical axes when compared to an example aspect in which a plurality of light transmitting sections are independently subjected to the optical axis alignment.

Further, the free space optical communication apparatuses in accordance with the present example embodiment (first free space optical communication apparatus 1 and second free space optical communication apparatus 101) employ the configuration in which the optical axis alignment section 20 causes two or more light transmitting sections to emit scan light to respective areas that are different from each other, and aligns, depending on which one of the light receiving sections the scan light is received by, the optical axis of a light transmitting section which is other than a light transmitting section that has emitted scan light received. Thus, according to the present example embodiment, it is possible to increase the efficiency of the optical axis alignment in scanning with use of the scan light, so that it is possible to increase the efficiency of the optical axis alignment of the plurality of light transmitting sections.

Software Implementation Example

The functions of part of or all of the free space optical communication apparatuses 1 and 101 can be realized by hardware such as an integrated circuit (IC chip) or can be alternatively realized by software.

Figure 13:
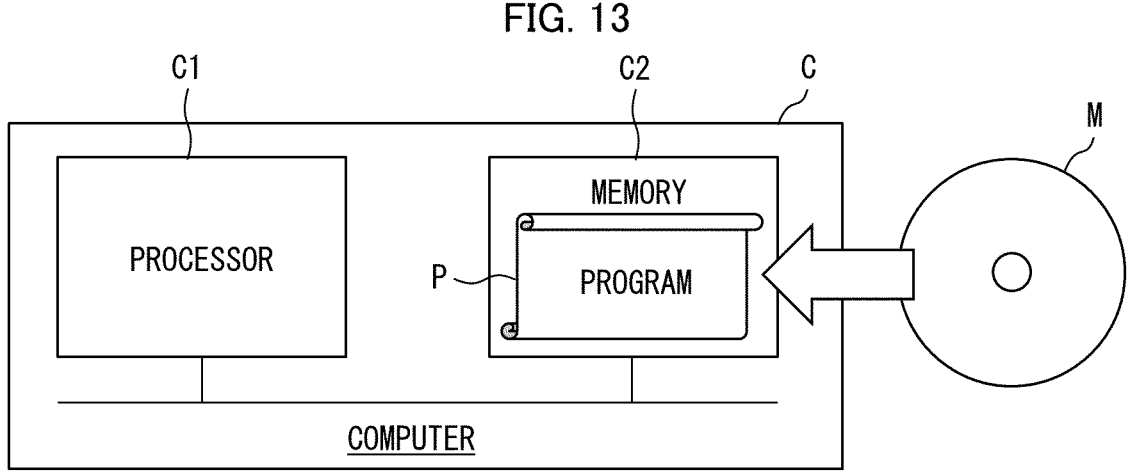
FIG. 13 is a block diagram illustrating a hardware configuration of a computer, which is one implementation example of each of the free space optical communication apparatuses in accordance with the example embodiments of the present invention.

In the latter case, each of the free space optical communication apparatuses 1 and 101 is realized by, for example, a computer that executes instructions of a program that is software realizing the foregoing functions. FIG. 13 illustrates an example of such a computer (hereinafter, referred to as "computer C"). The computer C includes at least one processor C1 and at least one memory C2. The memory C2 stores a program P for causing the computer C to function as the free space optical communication apparatuses 1 and 101. In the computer C, the processor C1 reads the program P from the memory C2 and executes the program P, so that the functions of the free space optical communication apparatuses 1 and 101 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with another apparatus. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

ADDITIONAL REMARK 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

ADDITIONAL REMARK 2

The whole or part of the example embodiments disclosed above can be described as, but not limited to, the following supplementary notes.

(Supplementary Note 1)

A free space optical communication apparatus including:
   a plurality of light transmitting means; and
   an optical axis aligning means for aligning an optical axis of each of the plurality of light transmitting means with a corresponding one of a plurality of light receiving means included in a communication target of the free space optical communication apparatus,
   the optical axes aligning means
      causing at least one of the plurality of light transmitting means to emit scan light while varying an emitting direction, and
      aligning an optical axis of a light transmitting means which is other than the at least one light transmitting means, based on an emitting direction of the scan light emitted from the at least one light transmitting means and received by a corresponding one of the plurality of light receiving means.

With this configuration, it is possible to increase the efficiency of the optical axis alignment in an example aspect that includes the plurality of light transmitting means and the plurality of light receiving means.

(Supplementary Note 2)

The free space optical communication apparatus according to the supplementary note 1, wherein the optical axes aligning means
   causes the at least one light transmitting means to emit preliminary scan light that is a bundle of rays, and
   controls the emitting direction of the scan light made to be emitted from the at least one light transmitting means, depending on which one of the plurality of light receiving means the preliminary scan light is received by.

In this configuration, the preliminary scanning of the preliminary scan light that is a bundle of rays and is transmitted over a wide area is performed before the scanning of the scan light. Therefore, the preliminary scanning can roughly estimate the direction of the optical axis, so that it is possible to increase the efficiency of the optical axis alignment.

(Supplementary Note 3)

The free space optical communication apparatus according to the supplementary note 1, wherein the optical axes aligning means
   aligns, based on an emitting direction of scan light emitted from each of three or more of the plurality of light transmitting means and received by a corresponding one of three or more of the plurality of light receiving means, an optical axis of a light transmitting means which is other than the three or more light transmitting means.

With this configuration, it is possible to align an optical axis of a light transmitting means which is other than the three or more light transmitting means, based on an emitting direction of each scan light, even in a case where the plurality of light transmitting means are inclined in the Z direction.

(Supplementary Note 4)

The free space optical communication apparatus according to the supplementary note 1, wherein the optical axes aligning means causes two or more of the plurality of light transmitting means to emit scan light to respective areas that are different from each other, and aligns an optical axis of a light transmitting means which is other than a light transmitting means that has emitted the scan light received, depending on which one of the plurality of light receiving means the scan light is received by.

With this configuration, it is possible to increase the efficiency of the optical axis alignment in the scanning with use of the scan light, resulting in increased efficiency of the optical axis alignment of the plurality of light transmitting means.

(Supplementary Note 5)

A free space optical communication system including a plurality of free space optical communication apparatuses, at least two of the plurality of free space optical communication apparatuses each including:

a plurality of light transmitting means; and an optical axis aligning means for aligning an optical axis of each of the plurality of light transmitting means with a corresponding one of a plurality of light receiving means included in a free space optical communication apparatus that is a communication target, the optical axes aligning means causing at least one of the plurality of light transmitting means to emit scan light while varying an emitting direction, and aligning an optical axis of a light transmitting means which is other than the at least one light transmitting means, based on an emitting direction of the scan light emitted from the at least one light transmitting means and received by a corresponding one of the plurality of light receiving means.

With this configuration, it is possible to increase the efficiency of the optical axis alignment among the plurality of light transmitting means and the plurality of the light receiving means.

(Supplementary Note 6)

A free space optical communication method for a first free space optical communication apparatus including a plurality of light transmitting means, and a second free space optical communication apparatus including a plurality of light receiving means and serving as a communication target of the first free space optical communication apparatus, the method including:

aligning an optical axis of each of the plurality of light transmitting means with a corresponding one of the plurality of light receiving means, aligning the optical axis including:

causing at least one of the plurality of light transmitting means to emit scan light while varying an emitting direction, and aligning an optical axis of a light transmitting means which is other than the at least one light transmitting means, based on an emitting direction of the scan light emitted from the at least one light transmitting means and received by a corresponding one of the plurality of light receiving means.

With this configuration, it is possible to increase the efficiency of the optical axis alignment among the plurality of light transmitting means and the plurality of the light receiving means.

(Supplementary Note 7)

A program causing a computer to operate as a free space optical communication apparatus according to any one of the supplementary notes 1 to 4, the program causing the computer to function as each of the means.

(Supplementary Note 8)

A free space optical communication apparatus including at least one processor, the processor carrying out:

a light transmission process of transmitting light from a plurality of a light transmitting means; and an optical axis alignment process of aligning an optical axis of each of the plurality of light transmitting means with a corresponding one of a plurality of light receiving means included in a communication target of the free space optical communication apparatus, in the optical axis alignment process, the processor carrying out:

a process of causing at least one of the plurality of light transmitting means to emit scan light while varying an emitting direction; and a process of aligning an optical axis of a light transmitting means which is other than the at least one light transmitting means, based on an emitting direction of the scan light emitted from the at least one light transmitting means and received by a corresponding one of the plurality of light receiving means.

Note that the free space optical communication apparatus may further include a memory. The memory may store a program for causing the processor to carry out each of the processes. The program may be stored in a computer-readable, non-transitory, tangible storage medium.

REFERENCE SIGNS LIST

1 Free space optical communication apparatus (free space optical communication apparatus)
101 Free space optical communication apparatus (communication target free space optical communication apparatus)
3 Scan light
10, 10-1 to 10-$n$ Light transmitting sections
11 Light emitting section
12 Light modulator
33 Preliminary scan light
130, 130-1 to 130-$n$ Light receiving sections
131 Condenser lens
132 Light receiving element
133 Receive circuit
400 Free space optical communication system

The invention claimed is:

1. A free space optical communication apparatus comprising a plurality of light transmitting sections and at least one processor, the at least one processor carrying out an optical axis alignment process of aligning an optical axis of each of the plurality of light transmitting sections with a corresponding one of a plurality of light receiving sections included in a communication target of the free space optical communication apparatus, in the optical axis alignment process, the at least one processor causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

2. The free space optical communication apparatus according to claim 1, wherein, in the optical axis alignment process, the at least one processor causes the at least one light transmitting section to emit preliminary scan light that is a bundle of rays, and controls the emitting direction of the scan light made to be emitted from the at least one light transmitting section, depending on which one of the light receiving sections the preliminary scan light is received by.

3. The free space optical communication apparatus according to claim 1, wherein, in the optical axis alignment process, based on an emitting direction of scan light emitted from each of three or more of the light transmitting sections and received by a corresponding one of three or more of the light receiving sections, the at least one processor aligns an optical axis of a light transmitting section which is other than the three or more light transmitting sections.

4. The free space optical communication apparatus according to claim 1, wherein, in the optical axis alignment process, the at least one processor causes two or more of the light transmitting sections to emit scan light to respective areas that are different from each other, and aligns an optical axis of a light transmitting section which is other than a light transmitting section that has emitted the scan light received, depending on which one of the light receiving sections the scan light is received by.

5. A free space optical communication system comprising a plurality of free space optical communication apparatuses, at least two of the plurality of free space optical communication apparatuses each comprising a plurality of light transmitting sections and at least one processor, the at least one processor carrying out an optical axis alignment process of aligning an optical axis of each of the plurality of light transmitting sections with a corresponding one of a plurality of light receiving sections included in a free space optical communication apparatus that is a communication target, in the optical axis alignment process, the at least one processor causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

6. The free space optical communication system according to claim 5, wherein, in the optical axis alignment process, the at least one processor causes the at least one light transmitting section to emit preliminary scan light that is a bundle of rays, and controls the emitting direction of the scan light made to be emitted from the at least one light transmitting section, depending on which one of the light receiving sections the preliminary scan light is received by.

7. The free space optical communication system according to claim 5, wherein, in the optical axis alignment process, based on an emitting direction of scan light emitted from each of three or more of the light transmitting sections and received by a corresponding one of three or more of the light receiving sections, the at least one processor aligns an optical axis of a light transmitting section which is other than the three or more light transmitting sections.

8. The free space optical communication system according to claim 5, wherein, in the optical axis alignment process, the at least one processor causes two or more of the light transmitting sections to emit scan light to respective areas that are different from each other, and aligns an optical axis of a light transmitting section which is other than a light transmitting section that has emitted the scan light received, depending on which one of the light receiving sections the scan light is received by.

9. A free space optical communication method for a first free space optical communication apparatus including a plurality of light transmitting sections, and a second free space optical communication apparatus including a plurality of light receiving sections and serving as a communication target of the first free space optical communication apparatus, the method comprising:

aligning an optical axis of each of the plurality of light transmitting sections with a corresponding one of the plurality of light receiving sections, aligning the optical axis comprising:

causing at least one of the plurality of light transmitting sections to emit scan light while varying an emitting direction, and aligning an optical axis of a light transmitting section which is other than the at least one light transmitting section, based on an emitting direction of the scan light emitted from the at least one light transmitting section and received by a corresponding one of the light receiving sections.

\* \* \* \* \*